(12) United States Patent
Cheng

(10) Patent No.: US 12,440,054 B2
(45) Date of Patent: Oct. 14, 2025

(54) COOKING DEVICE

(71) Applicant: YUNG SOON LIH FOOD MACHINE CO., LTD., Taichung (TW)

(72) Inventor: Jui-Tai Cheng, Taichung (TW)

(73) Assignee: YUNG SOON LIH FOOD MACHINE CO., LTD., Taichung (TW)

( * ) Notice: Subject to any disclaimer, the term of this patent is extended or adjusted under 35 U.S.C. 154(b) by 706 days.

(21) Appl. No.: 17/885,973

(22) Filed: Aug. 11, 2022

(65) Prior Publication Data
US 2024/0049900 A1   Feb. 15, 2024

(51) Int. Cl.
| | |
|---|---|
| *A47J 27/00* | (2006.01) |
| *A47J 36/04* | (2006.01) |
| *A47J 36/06* | (2006.01) |
| *A47J 36/32* | (2006.01) |
| *A47J 43/046* | (2006.01) |
| *A47J 43/07* | (2006.01) |

(52) U.S. Cl.
CPC ........... *A47J 27/002* (2013.01); *A47J 27/004* (2013.01); *A47J 36/04* (2013.01); *A47J 36/06* (2013.01); *A47J 36/32* (2013.01); *A47J 43/0465* (2013.01); *A47J 43/0722* (2013.01)

(58) Field of Classification Search
CPC .......... A23L 11/07; A23L 11/45; A23L 11/65; A23N 1/02; A47J 27/004; A47J 36/32; A47J 43/0465; A47J 27/002; A47J 36/04; A47J 36/06; A47J 36/165; A47J 43/072; B02C 4/06; B02C 4/286; B02C 4/44; F24C 7/08

USPC ......... 99/536, 510, 275, 353, 483, 485, 513, 99/516; 210/173, 251, 511; 426/489, 426/495, 518

See application file for complete search history.

(56) References Cited

U.S. PATENT DOCUMENTS 1,622,587 A * 3/1927 Housel ............... F24C 15/10
126/383.1

FOREIGN PATENT DOCUMENTS

CN   203987593   * 12/2014

* cited by examiner

*Primary Examiner* — V Y T Nguyen
(74) *Attorney, Agent, or Firm* — MUNCY, GEISSLER, OLDS & LOWE, P.C.

(57) ABSTRACT

A cooking device is provided, including a main body, a stirrer assembly, a heating assembly, a fixing assembly and a thermal insulation layer. The main body includes a bottom wall and a circumferential wall which define a receiving space therebetween. The heating assembly is disposed around and contacts an outer surface of the circumferential wall. The fixing assembly includes at least one restriction member and at least one latch unit, and the at least one restriction member is disposed around the circumferential wall and covers the heating assembly. The thermal insulation layer is disposed between the circumferential wall and the at least one restriction member, and the thermal insulation layer covers at least ⅔ of the outer surface of the circumferential wall.

12 Claims, 6 Drawing Sheets

COOKING DEVICE

BACKGROUND OF THE INVENTION

Field of the Invention

The present invention relates to a cooking device.

Description of the Prior Art

To cook in large quantities, a cooking device is usually heated at its bottom wall, and a stirrer driven by a motor is mounted on the bottom wall or inserted into the cooking device from its opening so as to avoid precipitation of ingredients.

However, since the cooking device as described above is heated at its bottom wall, the upper side of the cooking device cannot be heated sufficiently and the bottom side of the cooking device may be overheated, which has poor heating efficiency. In addition, the stirrer is non-detachable, which is inconvenient to clean after cooking.

The present invention is, therefore, arisen to obviate or at least mitigate the above-mentioned disadvantages.

SUMMARY OF THE INVENTION

The main object of the present invention is to provide a cooking device, which provides good heating efficiency and is convenient to clean.

To achieve the above and other objects, the present invention provides a cooking device, including: a main body, a stirrer assembly, a heating assembly, a fixing assembly and a thermal insulation layer. The main body includes a bottom wall and a circumferential wall which define a receiving space therebetween, and a side of the circumferential wall opposite to the bottom wall defines an opening. The stirrer assembly includes a stirrer disposed at a bottom side of the receiving space, and the stirrer includes a rotating portion, at least one blade connected to the rotating portion and at least one first magnetic unit. The at least one blade includes at least one engaging hole, and each of the at least one first magnetic unit includes a magnetic member and a cover member covering an outer surface of the magnetic member and detachably engaged within one of the at least one engaging hole. The at least one first magnetic unit is configured to correspond to the at least one second magnetic unit of a driving assembly disposed out of the main body. The heating assembly is disposed around and contacts an outer surface of the circumferential wall. The fixing assembly includes at least one restriction member and at least one latch unit, and the at least one restriction member is disposed around the outer surface of the circumferential wall and covers the heating assembly. Each of the at least one latch unit connects two end portions of one of the at least one restriction member in a circumferential direction of the main body. The thermal insulation layer is disposed between the circumferential wall and the at least one restriction member, and the thermal insulation layer covers at least ⅔ of the outer surface of the circumferential wall.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
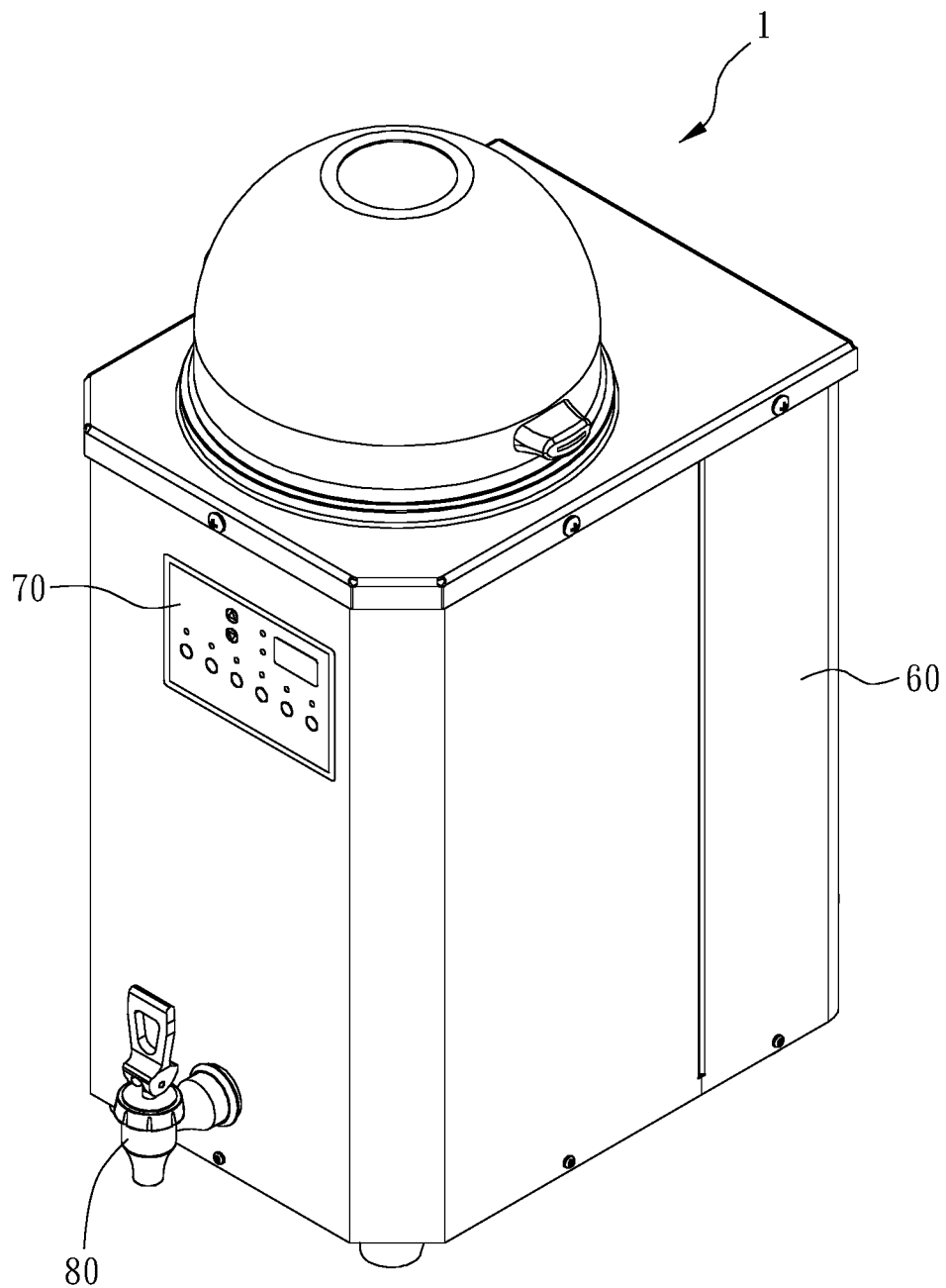
FIG. 1 is a stereogram of a preferable embodiment of the present invention.
Figure 2:
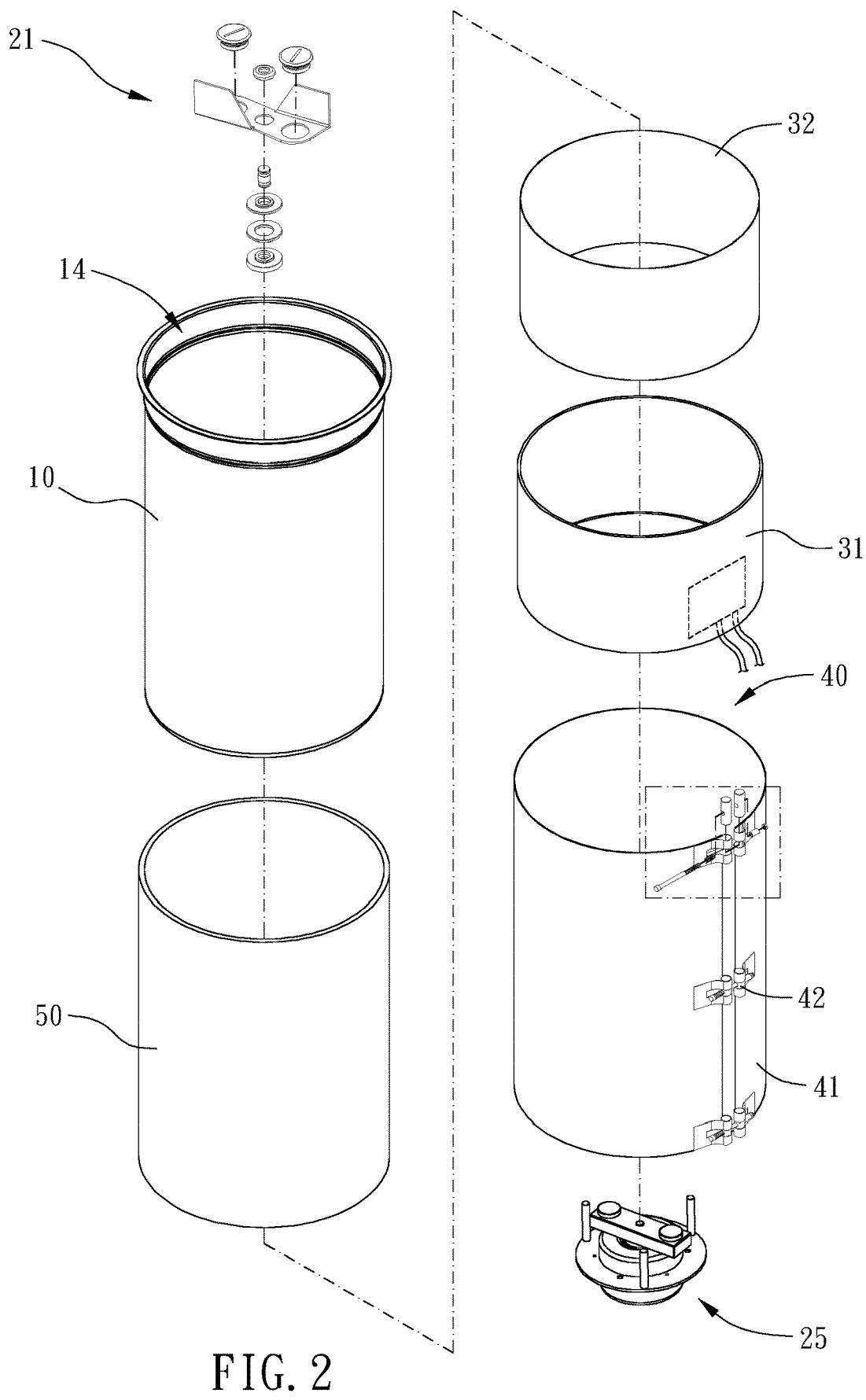
FIG. 2 is a partial breakdown drawing of a preferable embodiment of the present invention.

Please refer to FIGS. 1 to 7 for a preferable embodiment of the present invention. A cooking device 1 of the present invention includes a main body 10, a stirrer assembly 20, a heating assembly 30, a fixing assembly 40 and a thermal insulation layer 50.

The main body 10 includes a bottom wall 11 and a circumferential wall 12 which define a receiving space 13 therebetween, and a side of the circumferential wall 12 opposite to the bottom wall 11 defines an opening 14. The stirrer assembly 20 includes a stirrer 21 disposed at a bottom side of the receiving space 13, and the stirrer 21 includes a rotating portion 22, at least one blade 23 connected to the rotating portion 22 and at least one first magnetic unit 24. The at least one blade 23 includes at least one engaging hole 231, and each of the at least one first magnetic unit 24 includes a magnetic member 241 and a cover member 242 covering an outer surface of the magnetic member 241 and detachably engaged within one of the at least one engaging hole 231. The at least one first magnetic unit 24 is configured to correspond to at least one second magnetic unit 251 of a driving assembly 25 disposed out of the main body 10 so that the stirrer 21 is detachable and convenient to be cleaned. The heating assembly 30 is disposed around and contacts an outer surface of the circumferential wall 12 so as to effectively heat the receiving space 13. The fixing assembly 40 includes at least one restriction member 41 and at least one latch unit 42, and the at least one restriction member 41 is disposed around the circumferential wall 12 and covers the heating assembly 30. Each of the at least one latch unit 42 connects two end portions 411 of one of the at least one restriction member 41 in a circumferential direction of the main body 10. The thermal insulation layer 50 is disposed between the circumferential wall 12 and the at least one restriction member 41, and the thermal insulation layer 50 covers at least ⅔ of the outer surface of the circumferential wall 12, which greatly avoids heat exchange between the receiving space 13 and an external environment. Preferably, the thermal insulation layer 50 may cover at least ¾ of the outer surface of the circumferential wall 12 so as to provide preferable thermal insulation effect.

The heating assembly 30 includes at least one electric heating piece 31 which is circular and is disposed between the circumferential wall 12 and the thermal insulation layer 50. In this embodiment, each said electric heating piece 31 is a mica band heater which provides good heating efficiency, stable performance and is durable to use. The heating assembly 30 further includes at least one heat conducting plate 32 disposed between the at least one electric heating piece 31 and the circumferential wall 12, and the heat conducting plate 32 may be made of metals having preferable heat transfer effect so as to heat the main body 10 evenly.

Figure 7:
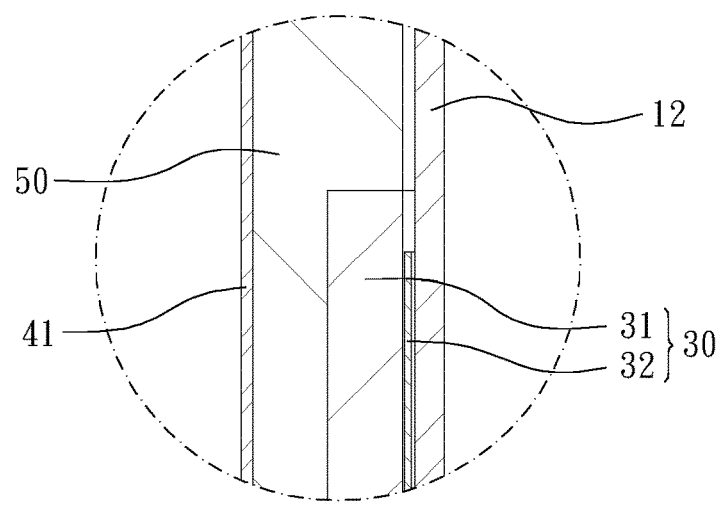
FIG. 7 is an enlargement of the area B of FIG. 5.

Specifically, an outer circumferential surface of each of the at least one electric heating piece 31 is entirely covered by the thermal insulation layer 50 so as to avoid heat loss. The thermal insulation layer 50 is made of a ceramic fiber insulation material which provides advantages of light weight, high temperature resistance, good thermal stability, low thermal conductivity and small specific heat. Preferably, in a radial direction of the main body 10, a portion of the thermal insulation layer 50 overlapped with the at least one electric heating piece 31 is thinner than a portion of the thermal insulation layer 50 non-overlapped with the at least one electric heating piece 31, as shown in FIG. 7, which allows the thermal insulation layer 50 to provide a smooth outer surface and be convenient to be restricted. In other embodiments, the at least one electric heating piece may be partially covered with the thermal insulation layer; the thermal insulation layer may be made of other materials.

Figure 3:
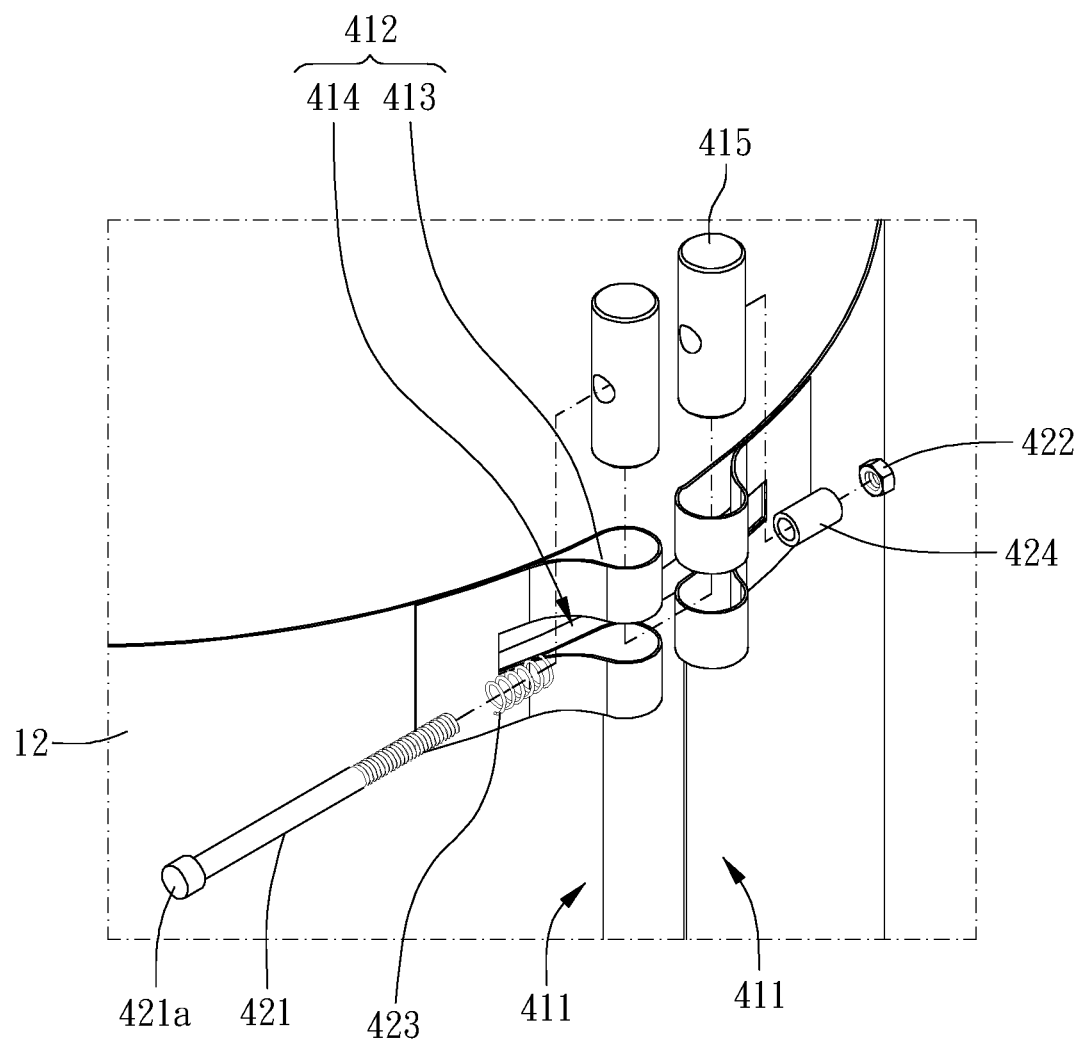
FIG. 3 is a partial enlargement of FIG. 2.
Figure 4:
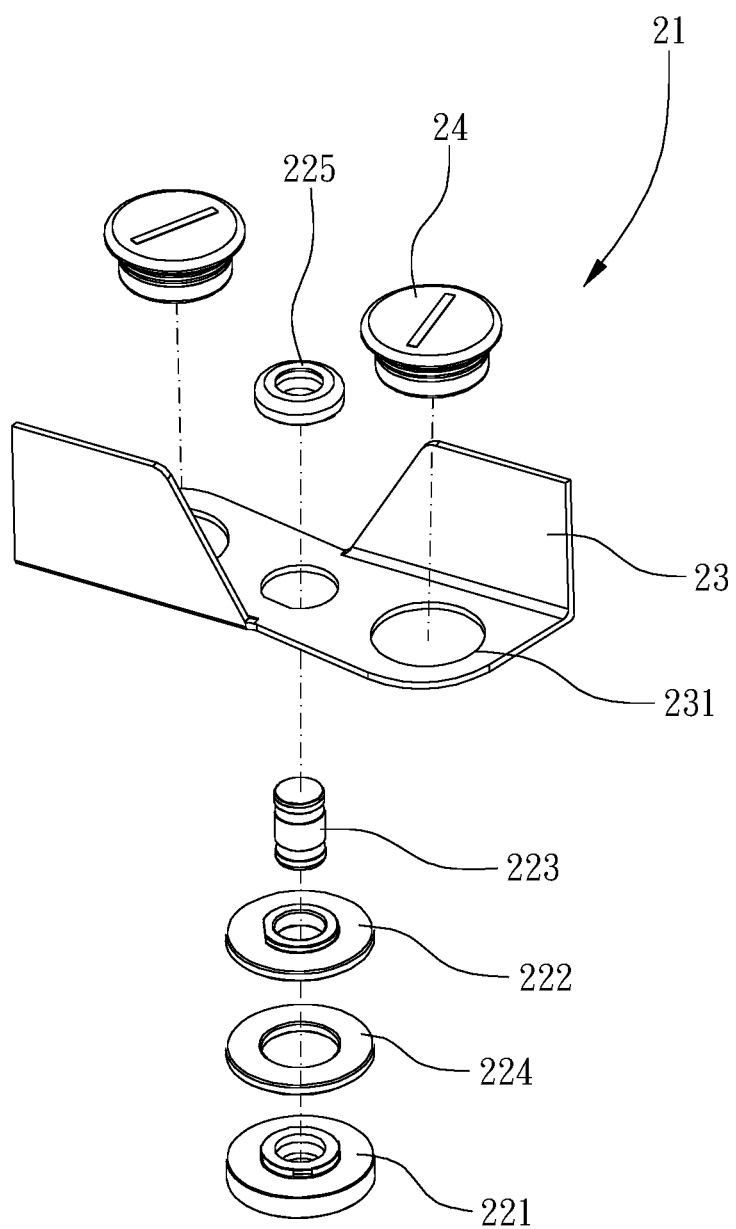
FIG. 4 is a breakdown drawing of a stirrer according to a preferable embodiment of the present invention.
Figure 5:
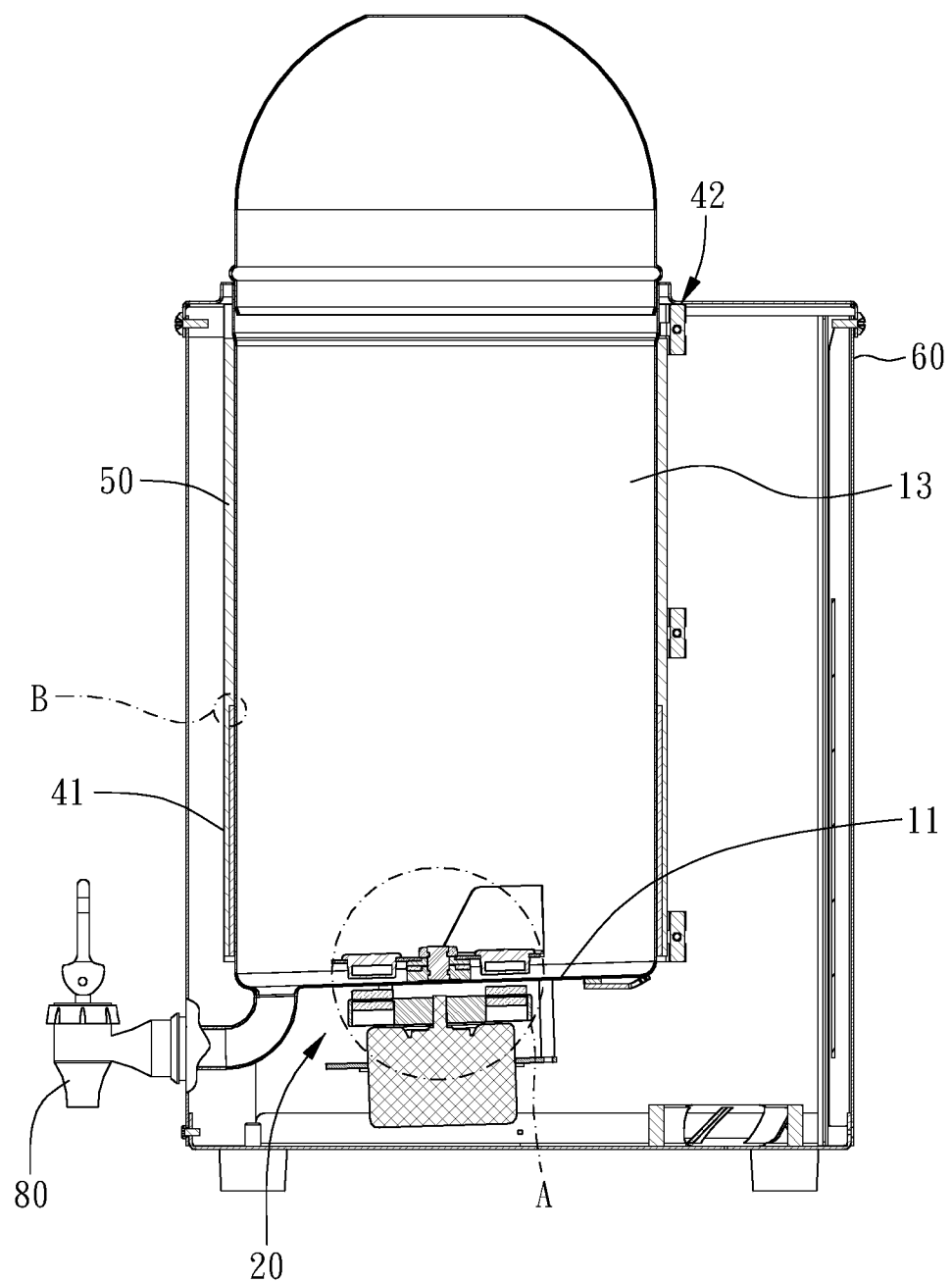
FIG. 5 is a cross-sectional view of a preferable embodiment of the present invention.
Figure 6:
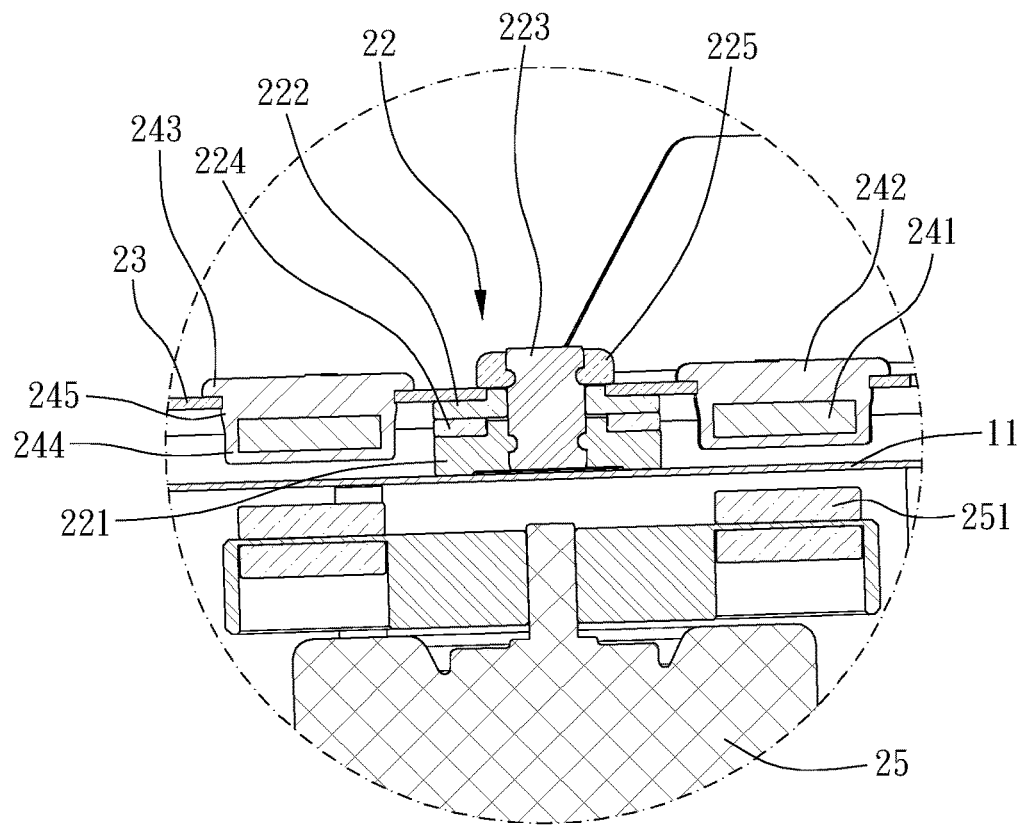
FIG. 6 is an enlargement of the area A of FIG. 5.

Please refer to FIG. 3, each of the two end portions 411 of one said restriction member 41 has a sleeving structure 412 which defines a sleeving hole 413 extending in a direction parallel to an axial direction of the main body 10 and a notch 414 laterally communicated with the sleeving hole 413. Each said sleeving hole 413 has a column 415 received therewithin, and each of the at least one latch unit 42 penetrates through two said columns 415 via said notches 414. Each of the at least one latch unit 42 includes a screw rod 421, a nut 422 screwed on the screw rod 421 and an elastic member 423 sleeved on the screw rod 421. One end of the elastic member 423 is abutted against one of the two end portions 411, and the other end of the elastic member 423 is abutted against one of the nut 422 and an enlarged head 421a of the screw rod 421. Therefore, the elastic member 423 urges the enlarged head 421a or the nut 422 to move in a direction remote from the two end portions 411 so that the two end portions 411 have a tendency to move toward each other when a diametrical dimension is changed by heating expansion and cold contraction. Preferably, each of the at least one latch unit 42 further includes a sleeve member 424 sleeved on the screw rod 421, the elastic member 423 is located between the enlarged head 421a and one of the two said columns 415, and the sleeve member 424 is located between the nut 422 and the other of the two said columns 415. When the nut 422 is rotated relative to the screw rod 421, the nut 422 can urge one of the two said columns 415 by the sleeve member 424, which avoids abrasion of the two said columns 415 and provides preferable force transmission effect.

Each said cover member 242 includes a head portion 243 and a body portion 244 connected with the head portion 243, the body portion 244 is engaged within one of the at least one engaging hole 231, and the head portion 243 is axially abutted against a surface of the at least one blade 23 remote from the bottom wall 11, which is easy to be assembled and disassembled for easy cleaning. Moreover, each said magnetic member 241 is entirely enclosed by one said cover member 242 and is located at a side of the at least one blade 23 close to the bottom wall 11 so as to keep a center of gravity of the at least one blade 23 to be low, which allows the stirrer 21 to be rotated stably. Preferably, each said cover member 242 is made of silicone which provides advantages of high temperature resistance, good thermal stability, low thermal conductivity and safety. Each said cover member 242 further includes a flange 245 radially protruding from the body portion 244, and an edge defining one said engaging hole 231 is embedded between the head portion 243 and the flange 245 for stable assembling.

The rotating portion 22 includes a base 221, a first connecting member 222 and a shaft 223 connecting the base 221 and the first connecting member 222. The base 221 is abuttable against the bottom wall 11, and the first connecting member 222 is non-rotatably connected with the at least one blade 23 and is located between the at least one blade 23 and the base 221. The first connecting member 222 and the shaft 223 are made of ceramics or polytetrafluoroethylene and are rotatable relative to each other. The rotating portion 22 further includes a second connecting member 224 non-rotatably disposed on the base 221, the second connecting member 224 is made of ceramics or polytetrafluoroethylene and is located between the first connecting member 222 and the base 221, and the first connecting member 222 and the base 221 has no contact. The base 221 is made of silicone, the rotating portion 22 further includes a retainer 225 which is made of silicone and axially engaged with the shaft 223, and the at least one blade 23 is disposed between the first connecting member 222 and the retainer 225 for stable restriction of the at least one blade 23. Therefore, the base 221 can be attached to the bottom wall 11 and spaced the at least one blade 23 from the bottom wall 11 so as to avoid abrasion of the at least one blade 23 and the bottom wall 11; and the first connecting member 222 can be smoothly rotated relative to the second connecting member 224 when the at least one blade 23 is driven to rotate. In addition, the base 221 is easy to be removed from the bottom wall 11, which is convenient to be cleaned.

The cooking device 1 further includes a housing 60, and the main body 10 is spacingly disposed within the housing 60. The stirrer assembly 20 further includes the driving assembly 25 disposed between the bottom wall 11 and a bottom side of the housing 60 so that the at least one second magnetic unit 251 can drive the at least one blade 23 to rotate with the bottom wall 11 disposed therebetween. The cooking device 1 further includes a control panel 70 disposed on the housing 60, the control panel 70 is electrically connected with the stirrer assembly 20 and the heating assembly 30 so as to control the heating temperature and the rotation speed of the at least one blade 23. The cooking device 1 further includes a liquid outlet 80, and the liquid outlet 80 selectively communicates the receiving space 13 with an external environment of the housing 60 through the bottom wall, which is convenient for liquid discharge.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A cooking device, including:
    a main body, including a bottom wall and a circumferential wall which define a receiving space therebetween, a side of the circumferential wall opposite to the bottom wall defining an opening;
    a stirrer assembly, including a stirrer disposed at a bottom side of the receiving space, the stirrer including a rotating portion, at least one blade connected to the rotating portion and at least one first magnetic unit, the at least one blade including at least one engaging hole; each of the at least one first magnetic unit including a magnetic member and a cover member covering an outer surface of the magnetic member and detachably engaged within one of the at least one engaging hole, the at least one first magnetic unit being configured to correspond to at least one second magnetic unit of a driving assembly disposed out of the main body;
    a heating assembly, disposed around and contacting an outer surface of the circumferential wall;

a fixing assembly, including at least one restriction member and at least one latch unit, the at least one restriction member disposed around the circumferential wall and covering the heating assembly, each of the at least one latch unit connecting two end portions of one of the at least one restriction member in a circumferential direction of the main body; and a thermal insulation layer, disposed between the circumferential wall and the at least one restriction member, the thermal insulation layer covering at least ⅔ of the outer surface of the circumferential wall.

2. The cooking device of claim 1, wherein the heating assembly includes at least one electric heating piece which is circular and is disposed between the circumferential wall and the thermal insulation layer, and in a radial direction of the main body, a portion of the thermal insulation layer overlapped with the at least one electric heating piece is thinner than a portion of the thermal insulation layer non-overlapped with the at least one electric heating piece.

3. The cooking device of claim 2, wherein the heating assembly further includes at least one heat conducting plate disposed between the at least one electric heating piece and the circumferential wall.

4. The cooking device of claim 2, wherein an outer circumferential surface of each of the at least one electric heating piece is entirely covered by the thermal insulation layer.

5. The cooking device of claim 1, wherein the thermal insulation layer is made of a ceramic fiber insulation material.

6. The cooking device of claim 1, wherein each said cover member includes a head portion and a body portion connected with the head portion, the body portion is engaged within one of the at least one engaging hole, and the head portion is axially abutted against a surface of the at least one blade remote from the bottom wall.

7. The cooking device of claim 6, wherein each said magnetic member is entirely enclosed by one said cover member and is located at a side of the at least one blade close to the bottom wall.

8. The cooking device of claim 1, wherein the rotating portion includes a base, a first connecting member and a shaft connecting the base and the first connecting member, the base is abuttable against the bottom wall, the first connecting member is non-rotatably connected with the at least one blade and is located between the at least one blade and the base, and the first connecting member and the shaft are made of ceramics or polytetrafluoroethylene and are rotatable relative to each other.

9. The cooking device of claim 8, wherein the rotating portion further includes a second connecting member non-rotatably disposed on the base, the second connecting member is made of ceramics or polytetrafluoroethylene and is located between the first connecting member and the base, and the first connecting member and the base has no contact.

10. The cooking device of claim 1, wherein each of the two end portions of one said restriction member has a sleeving structure which defines a sleeving hole extending in a direction parallel to an axial direction of the main body and a notch laterally communicated with the sleeving hole, each said sleeving hole has a column received therewithin, and each of the at least one latch unit penetrates through two said columns via said notches.

11. The cooking device of claim 1, wherein each of the at least one latch unit includes a screw rod, a nut screwed on the screw rod and an elastic member sleeved on the screw rod, one end of the elastic member is abutted against one of the two end portions, and the other end of the elastic member is abutted against one of the nut and an enlarged head of the screw rod.

12. The cooking device of claim 3, wherein an outer circumferential surface of each of the at least one electric heating piece is entirely covered by the thermal insulation layer; the thermal insulation layer is made of a ceramic fiber insulation material; each said cover member includes a head portion and a body portion connected with the head portion, the body portion is engaged within one of the at least one engaging hole, and the head portion is axially abutted against a surface of the at least one blade remote from the bottom wall; each said cover member further includes a flange radially protruding from the body portion, and an edge defining one said engaging hole is embedded between the head portion and the flange; each said cover member is made of silicone; each said magnetic member is entirely enclosed by one said cover member and is located at a side of the at least one blade close to the bottom wall; the rotating portion includes a base, a first connecting member and a shaft connecting the base and the first connecting member, the base is abuttable against the bottom wall, the first connecting member is non-rotatably connected with the at least one blade and is located between the at least one blade and the base, and the first connecting member and the shaft are made of ceramics or polytetrafluoroethylene and are rotatable relative to each other; the rotating portion further includes a second connecting member non-rotatably disposed on the base, the second connecting member is made of ceramics or polytetrafluoroethylene and is located between the first connecting member and the base, and the first connecting member and the base has no contact; the base is made of silicone, the rotating portion further includes a retainer which is made of silicone and axially engaged with the shaft, and the at least one blade is disposed between the first connecting member and the retainer; each of the two end portions of one said restriction member has a sleeving structure which defines a sleeving hole extending in a direction parallel to an axial direction of the main body and a notch laterally communicated with the sleeving hole, each said sleeving hole has a column received therewithin, and each of the at least one latch unit penetrates through two said columns via said notches; each of the at least one latch unit includes a screw rod, a nut screwed on the screw rod and an elastic member sleeved on the screw rod, one end of the elastic member is abutted against one of the two end portions, and the other end of the elastic member is abutted against one of the nut and an enlarged head of the screw rod; each of the at least one latch unit further includes a sleeve member sleeved on the screw rod, the elastic member is located between the enlarged head and one of the two said columns, and the sleeve member is located between the nut and the other of the two said columns; the cooking device further includes a housing, the main body is spacingly disposed within the housing, and the stirrer assembly further includes the driving assembly disposed between the bottom wall and a bottom side of the housing; the cooking device further includes a control panel disposed on the housing, the control panel is electrically connected with the stirrer assembly and the heating assembly; and the cooking device further includes a liquid outlet, the liquid outlet selectively communicates the receiving space with an external environment of the housing through the bottom wall.

* * * * *